Patented Sept. 1, 1925.

1,552,029

UNITED STATES PATENT OFFICE.

BENJAMIN H. BENNETTS, OF TACOMA, WASHINGTON.

METHOD OF PRECIPITATING COPPER.

No Drawing.   Application filed April 24, 1923. Serial No. 634,382.

*To all whom it may concern:*

Be it known that I, BENJAMIN H. BENNETTS, a citizen of the United States, residing at Tacoma, in the county of Pierce, State of Washington, have invented certain new and useful Improvements in Methods of Precipitating Copper, of which the following is a specification.

My invention relates to a part of the treatment of copper ore previous to its smelting and has for its objects to provide a cheap and efficient means of producing a precipitate containing copper compounds which can be easily shipped to the smelter and handled thereat.

In the present practice of extracting copper, the ore is treated so as to produce a soluble copper sulphate, and this solution is either treated electrolytically or with iron, to precipitate the copper, which is then smelted. Both the electrolytic and iron treatments are, however, expensive.

I have succeeded in producing a precipitate of copper carbonate, which is in a desirable form for smelting as well as for shipping to the smelter. This result is attained by dissolving the copper sulphate, above referred to, and treating the solution with powdered limestone, or calcium carbonate. A precipitate is formed in a few hours which is a mixture of copper carbonate and calcium sulphate, which may then be dried and shipped or stored, as desired.

Having therefore described my invention, what I claim is:—

The method of precipitating copper consisting in treating a solution of copper sulphate with pulverized lime stone, or calcium carbonate, whereby a precipitate of copper carbonate and calcium sulphate is obtained.

BENJAMIN H. BENNETTS.